US012589294B2

(12) United States Patent　(10) Patent No.:　US 12,589,294 B2
Black et al.　(45) Date of Patent:　Mar. 31, 2026

(54) SYSTEMS AND METHODS FOR ELECTRONIC GAME CONTROL WITH VOICE DETECTION AND AUDIO STREAM PROCESSING

(71) Applicant: Sony Interactive Entertainment Inc., Tokyo (JP)

(72) Inventors: Glenn Black, San Francisco, CA (US); Murugan Rajenthiran, Karnataka (IN)

(73) Assignee: Sony Interactive Entertainment Inc., Tokyo (JP)

( * ) Notice: Subject to any disclaimer, the term of this patent is extended or adjusted under 35 U.S.C. 154(b) by 227 days.

(21) Appl. No.: 18/540,837

(22) Filed: Dec. 14, 2023

(65) Prior Publication Data

US 2025/0195999 A1　Jun. 19, 2025

(51) Int. Cl.
　*A63F 13/424*　(2014.01)
　*A63F 13/21*　(2014.01)
　*G06F 3/16*　(2006.01)
　*G10L 15/22*　(2006.01)
(52) U.S. Cl.
　CPC ............ *A63F 13/424* (2014.09); *A63F 13/21* (2014.09); *G06F 3/167* (2013.01)
(58) Field of Classification Search
　CPC .... A63F 13/215; A63F 13/217; A63F 13/424; A63F 13/63; A63F 13/79; A63F 2300/1081; A63F 2300/308; A63F 2300/6072; G06F 3/167; G10L 15/16; G10L 15/22; G10L 15/26; G10L 17/00; G10L 25/51; G06N 20/00; G06N 3/02; G06N 3/09
　See application file for complete search history.

(56) References Cited

U.S. PATENT DOCUMENTS

| | | | | |
|---|---|---|---|---|
| 10,449,440 B2 * | 10/2019 | Sardari | ................. | A63F 13/424 |
| 2006/0204012 A1 | 9/2006 | Marks et al. | | |
| 2011/0182481 A1 * | 7/2011 | Dernis | ................... | G10L 17/10 |
| | | | | 382/116 |
| 2012/0327193 A1 | 12/2012 | Dernis et al. | | |

(Continued)

OTHER PUBLICATIONS

International Search Report and Written Opinion in International Appln. No. PCT/IB2024/060725, mailed on Feb. 13, 2025, 9 pages.

*Primary Examiner* — Lawrence S Galka
(74) *Attorney, Agent, or Firm* — Fish & Richardson P.C.

(57) ABSTRACT

System, process, and device configurations are provided for electronic game control with voice detection and audio stream processing. A method can include controlling presentation of electronic game content on a display, receiving an audio input stream including voice data for at least one user of the electronic game and detecting at least one command for the electronic game content presentation based on the at least one user voice. The method can also include controlling presentation for the electronic game content based on voice command. In addition, configurations are provided for training a machine model for identification of a user voice, spatial identification of user position, and filtering of audio input streams to determine a plurality of user commands in parallel. Processes may be used to characterize human voice using models and to detect users in a group. User voice may be a control input in addition to game controller inputs.

18 Claims, 4 Drawing Sheets

(56)                References Cited

U.S. PATENT DOCUMENTS

| | | | |
|---|---|---|---|
| 2015/0254057 A1* | 9/2015 | Klein | H04N 21/4668 |
| | | | 704/275 |
| 2015/0304697 A1* | 10/2015 | Trombetta | A63F 13/00 |
| | | | 725/116 |
| 2018/0095708 A1* | 4/2018 | Black | A63F 13/211 |
| 2018/0285065 A1 | 10/2018 | Jeong | |
| 2019/0057688 A1* | 2/2019 | Black | G06F 3/167 |
| 2019/0103106 A1* | 4/2019 | Boeda | G06F 40/40 |
| 2019/0371327 A1* | 12/2019 | Quinn | G10L 15/16 |
| 2020/0101383 A1* | 4/2020 | Hwang | A63F 13/215 |
| 2020/0380974 A1* | 12/2020 | Gallagher | G10L 15/22 |
| 2020/0384362 A1* | 12/2020 | Shah | A63F 13/424 |
| 2021/0327418 A1* | 10/2021 | Kim | G06F 21/31 |
| 2022/0256676 A1* | 8/2022 | Lang | H05B 47/165 |
| 2023/0128422 A1* | 4/2023 | Li | G10L 15/24 |
| | | | 345/156 |

* cited by examiner

200

205 — Control Electronic Game Content Presentation

210 — Receive/Detect Audio Input Stream

216 — Identify At Least One User

215 — Identify User Audio

220 — Detect User Game Command

225 — Control Electronic Game Presentation

226 — Output User(s) Voice Data/Chat

300

400

SYSTEMS AND METHODS FOR ELECTRONIC GAME CONTROL WITH VOICE DETECTION AND AUDIO STREAM PROCESSING

FIELD

The present disclosure is directed to systems and methods for electronic game control with voice detection, audio stream processing and interactive entertainment control, including multiple input stream voice detection, electronic game control, game content rendering, gaming device operations, and gaming device processes.

BACKGROUND

Computer and console games have been developed in many styles for different gaming systems and platforms. As device processing increases and game environments become more immersive, there is a desire for enhancement of content and customization of game interaction with users. There also exists a desire to improve game control features. Conventional game operation and control inputs are often limited by the configuration of input units. There exists a desire to provide additional forms of input. In addition, there exists a desire to utilize user communications during game sessions. Many electronic games provide network functionality and gameplay for users from one or more locations. With conventional game systems, detection of user comments may be difficult. There exists a desire to detect user communications during game sessions for control of electronic game output.

BRIEF SUMMARY OF THE EMBODIMENTS

Disclosed and described herein are systems, methods and device configurations for electronic game control with voice detection and audio stream processing. In one embodiment, a method includes controlling, by a device, presentation of electronic game content on a display, and receiving, by the device, an audio input stream, the audio input stream including voice data for at least one user of the electronic game. The method also includes detecting, by the device, at least one user voice in the audio input stream, and detecting, by the device, at least one command for the electronic game content presentation based on the voice data. The method also includes controlling, by the device, presentation for the electronic game content based on the at least one command.

In one embodiment, the audio input stream is detected by at least one sensor during presentation of the electronic game content, and wherein voice data of a plurality of users is detected in parallel.

In one embodiment, the audio input stream is detected for a plurality of users by at least one audio input sensor of the device.

In one embodiment, the audio input stream is detected by a microphone array sensor of the device, and wherein detection of voice data includes detection of user position relative to the microphone array.

In one embodiment, detecting at least one user voice in the audio input stream includes using at least one voice reference of a user profile.

In one embodiment, detecting at least one user voice in the audio input stream includes using a machine model for identification of a user voice.

In one embodiment, detecting at least one command for the electronic game content includes spatial identification of user position.

In one embodiment, detecting at least one command for the electronic game content includes detecting a control command for at least one game element of the electronic game.

In one embodiment, detecting at least one command for the electronic game content includes filtering at least one voice input for detection of the at least one command.

In one embodiment, the method includes outputting a separated voice transcript for the audio input stream.

Another embodiment is directed to a device configured for electronic game control with voice detection and audio stream processing. The device includes an interface configured to output gaming content, a memory storing executable instructions and a controller, coupled to the interface and memory. The controller is configured to control electronic game content presentation on a display, and receive an audio input stream, the audio input stream including voice data for at least one user of the electronic game. The controller is also configured to detect at least one user voice in the audio input stream, and detect at least one command for the electronic game content presentation based on the voice data. The controller is also configured to control presentation for the electronic game content based on the at least one command.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
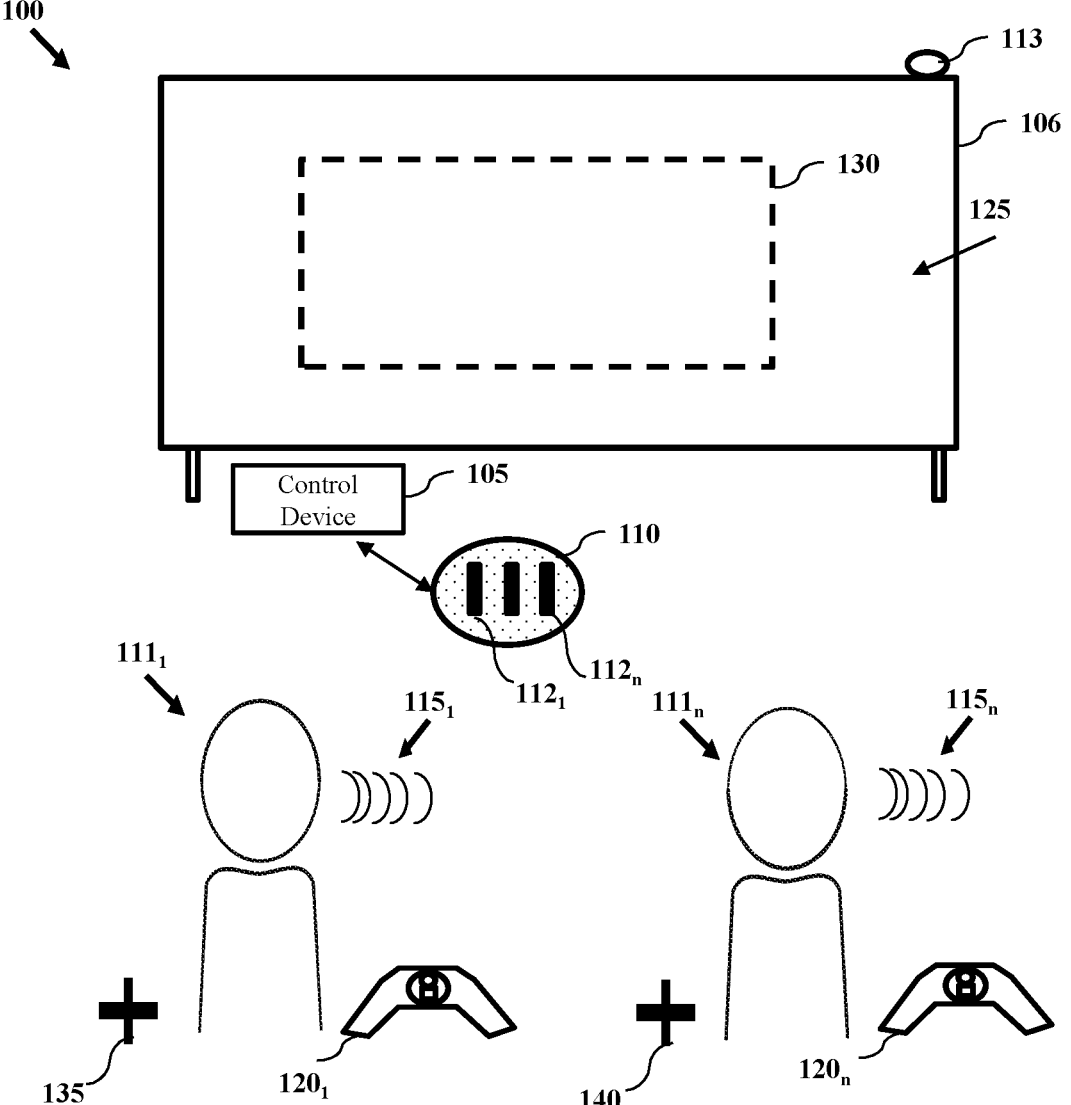
FIG. 1 is a graphical representation of electronic game control with voice detection and audio stream processing according to one or more embodiments.

System, process, and device configurations are provided for electronic game control with voice detection and audio stream processing. Embodiments include device configurations and processes to receive an audio input stream including voice data for at least one user of the electronic game, detect at least one command for the electronic game content presentation based on the at least one user voice, and control presentation for the electronic game content based on voice command. Embodiments may use and train models for human speech behavior to detect and isolate human voices in a group of multiple individuals. Detected voice data may be output as separate digital audio streams for parallel processing by a computer system. Embodiments allow a group of users to simultaneously interact with electronic game content using voice commands in a multiplayer situation. Embodiments can use one or more sound input devices and sound processing units in controllers or consoles, such as a microphone array and digital signal processor (DSP), to detect users based on one or more of phase and timing differences of the audio input. Embodiments can include spatial identification of one or more users to differentiate between voice inputs and similar sounding users. According to embodiments, spatial identification and user position may be detected by one or more other sensors, such as video and in-game information (e.g., number of players, game genre, etc). Processes and operations may be performed by a controller, such as a self-contained microcontroller, or within system software of a gaming device, such as a control console.

One aspect of the disclosure is directed to controlling electronic game content presentation on a display using voice input and voice data identified for a particular user of a game, such as a first user of a multiplayer game. In a gameplay setting with multiple users in close proximity, identification of a user, or a source of the audio, may be required to accurately control game content. According to embodiments, processes and device configurations may be configured to receive and/or detect user audio input for a plurality of users and identify one or more commands from the audio stream. Audio input streams may include user voice data detected in parallel, or detecting output of user voice from a plurality of sources during a same time period. Configurations are provided for training a machine model for identification of a user voice, spatial identification of user position, and filtering of audio input streams to determine a plurality of user commands in parallel. Processes may be used to characterize human voice using models and to detect users in a group. User voice may be a control input in addition to game controller inputs. According to embodiments, in addition to identification of a user voice, processes may detect a command from user audio. The commands may be plain language commands or descriptions of actions from a user for control of a game. Voice commands can include one or more directional commands for moving a game element, one or more functional commands (e.g., jump, directional move, fire, punch, etc.). Voice commands may be detected in addition to, or separate from, other user controls. For example, in a fighting game, the voice command may include one or more actions such as punch, kick, and block. One advantage of using a voice command may be the ability to provide more information or complex information for control of a game element. By way of example, in a fighting game, the voice command may include a combination of actions (e.g., double punch, then kick), and specific actions to take (e.g., uppercut, double high kick, spinning back kick, etc.). Voice commands may be assessed and device operation may be modified, and game content output may be modified and/or a game element controlled with respect to a voice command. Voice commands may supplement one or more existing game features, including modifying a function of a command, such as modifying the function associated with a button press of a game controller.

One aspect of the disclosure is directed to processing audio input streams including one or more user voices. In a multiplayer game with users in different locations on different consoles, audio streams may be provided independently. For multiple players in the same location, with background noise or a multiplayer format, embodiments provide processes and device configurations to identify users and user voices in an audio stream. According to embodiments, audio sensors may include a plurality of microphones or an microphone array sensor configured to detect audio. According to embodiments, spatial awareness and detection may be used to differentiate users in the same location. Spatial awareness may be used to detect a user from one or more background noise sources. User voice data may be detected using one or more parameters available to a device including a user profile, game type and commands associated with an electronic game. In addition to control based on voice commands, embodiments provide control features for game content output based a spatial position of a user relative to a gaming system or game display. Multiple players in a similar location or close proximity may be distinguished based on one or more of spatial position and user voice parameters to detect one or more commands.

System and device configurations are provided including operations performed by an interactive control device, such as a game console, display device, and handheld gaming device. Configurations may also be employed by a network device or server to control media output or provide control signals to an interactive control device. By way of example, an audio input stream detected during presentation of a movie or broadcast content may be used to control operations of the display device. System configurations and processes are not limited to electronic game content.

Embodiments are directed to gaming systems which may include consoles, processors or servers that generate game media and interactive entertainment devices configured to provide output and receive user input. Systems and methods also provide configurations and operations for controlling the output of electronic game content to interface operability. Some control of game and media content is limited by physical control buttons. Interface functions may be improved by providing controls that allow for user commands to be provided by voice.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1 is a graphical representation of electronic game control with voice detection and audio stream processing according to one or more embodiments. System 100 may be configured for presenting electronic game content on a display and one or more operations based on user voice data. User voice data may be detected for one or more users in the same location, and/or user voice data may be received by way of a communication channel associated with a game session. Embodiments allow for an audio stream to be detected and received for users in one or more locations. According to embodiments, one or more devices of system 100 may be configured for electronic game control with voice detection and audio stream processing. System 100 includes control device 105 which may be configured to control electronic game content presentation on display 106. According to embodiments, control device 105 may be a standalone device, such as a game console or game media player. According to embodiments, control device 105 and display 106 may be parts of the same unit, such as a display device with a processor or a handheld gaming device.

According to embodiments, control device 105 may be configured to detect and/or receive user audio, such as voice output $115_1$-$115_n$, from one or more users, such as users $111_1$-$111_n$, respectively. Control device 105 may be controlled by one or more game controllers $120_1$-$120_n$. FIG. 1 illustrates game content presentation 125 including one or more game elements, such as game element 130. According to embodiments, control device 105 may be configured to control presentation format for the electronic game content based on at least one command detected from user audio, such as one or more of voice output $115_1$-$115_n$. According to embodiments, the command may be to control position of a user controlled object, make a selection, or provide an input command in general.

According to embodiments, system 100 includes one or more sensors, such as sensor 110. Sensor 110 may include one of more microphones configured to detect sound, including voice output $115_1$-$115_n$, from one or more of users $111_1$-$111_n$, respectively. Sensor 110 may output detected sound to control device 105. According to embodiments, sensor 110 may include a plurality of microphones $112_{1-n}$ configured as an array. Microphones $112_{1-n}$ may be configured to output detected audio with one or more parameters to identify one or more spatial positions of users $111_1$-$111_n$. By way of example, one or more arrival times of detected audio may be used to detect user $111_1$ associated with position 135 relative to audio from user $111_n$ associated with position 140.

According to embodiments, system 100 includes one or more sensors such as camera 113 configured to detect a position of a user, such as position 135 of user $111_1$ and position 140 of user $111_n$. Controller 105 may use position of a user to aid in identifying user audio, such as user voice and user commands from an audio input stream. Sensor 113 may be an image capture device, such as a camera configured to capture images and/or video image date of users $111_{1-n}$. According to embodiments, sensor 113 may provide image data to control device 105. Control device 105 may be configured to capture position of users $111_{1-n}$ and may perform eye tracking. One or more of sensor 110 and sensor 113 may be integrated with display 106. According to embodiments, control device 105 may receive output from one or more devices, such as sensor 110, sensor 113 or display 106. Control device 105 may be configured to detect audio for one or more users relative to electronic game content 125 on display 106. User voice commands may be used to control game element 130. According to embodiments, detection of user voice commands may be performed using a machine learning language model. Processes for identification of voice commands are discussed with reference to FIGS. 2 and 5. According to embodiments, system 100 may be configured to use and update machine learning models. Based on one or more user voice commands, control device 105 may be configured to control a presentation format and the electronic game content. According to embodiments, the voice command modifies the electronic game content presentation. According to embodiments, control device 105 may be configured to perform one or more network operations including communicating with one or more servers on a communication network. Network operations can include providing one or more audio streams for one or more users associated with a game session.

According to embodiments, user voice commands may be detected and monitored, with user permission, during output of an electronic game and interactive media in general. According to embodiments, control device 105 relates to a media output device, such as a game console. It should be appreciated that that one or more of a server and display device 106 may be configured to provide electronic game functions, game control and interactive media output. It should also be appreciated that detection of a user voice command parameter is not limited to electronic games. The principles of the disclosure may be provided to other forms of network and interactive communication, and device control in general. For purposes of illustration and example of operation, system 100 and control device 105 may detect user voice commands for users $111_{1-n}$ during presentation of electronic game content by display 106. Users $111_{1-n}$ may be controlling an electronic game output by control device 105. According to embodiments, one or more elements of system 100 may be used to detect a user voice commands parameters.

System 100 may provide features to improve user experience, wherein functions and operations described herein are performed following user consent, with express notice to a user, and/or in alignment with one or more user settings for user privacy. It should be appreciated that embodiments may be applied to interactive entertainment with one or more users. Processes described herein are not limited to gaming content.

Figure 2:
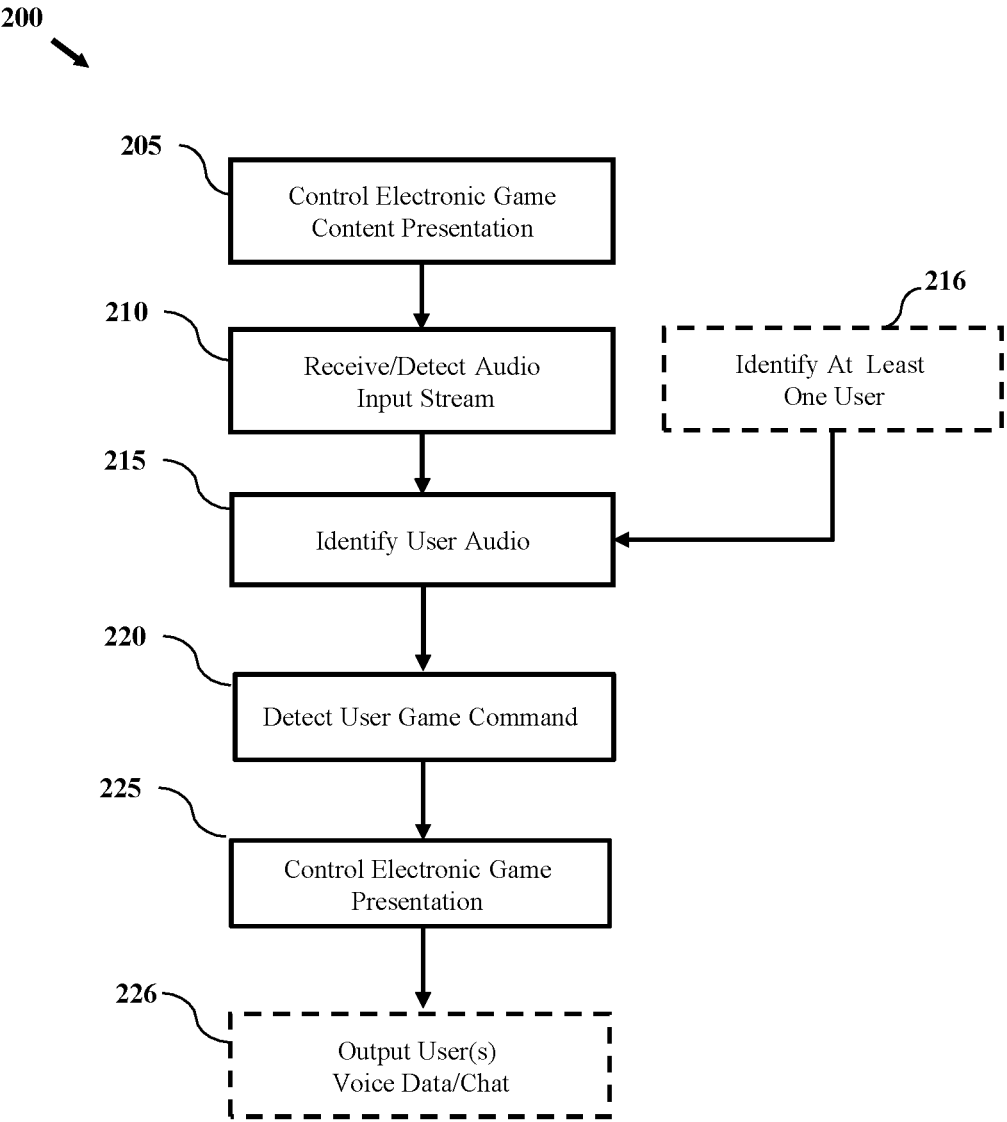
FIG. 2 illustrates a process for electronic game control with voice detection and audio stream processing according to one or more embodiments.

FIG. 2 illustrates a process for electronic game control with voice detection and audio stream processing according to one or more embodiments. Process 200 may be performed for interactive game control and can include controlling presentation format for the electronic game content, control of game elements and output of detected voice inputs based on one or more detected voice commands and audio stream input. Process 200 may modify game presentation using user voice commands, including controlling action of a game element, moving a game element, selecting a game element and providing a game control command for gaming content, gaming video and media output. Process 200 may be performed by a device, such as device 300 and/or controller 310 of FIG. 3, for voice detection and audio stream processing. Process 200 may be initiated by a device (e.g., control device 105, device 305, etc.) controlling electronic game content presentation on a display at block 205. According to embodiments, gaming content may be output to a display (e.g., display 110). According to embodiments, electronic game content is presented at block 205 including at least one of a controllable game element and game interface for user control. Processes and configurations described herein allow for receiving an audio input stream, detection of user voice commands, and audio stream processing. User commands may detected by one or more control devices, such as hand held devices and wearables.

At block 210, process 200 includes receiving an audio input stream. The audio input stream can include voice data for at least one user of the electronic game and may be received by way of one or more sensors, including sensors on a control device, game controller sensors, display sensors, head worn device, and console sensors. Audio streams may be received by a control device or network device by way of a network connection. By way of example, when process 200 is performed by a console device, the console device may receive one or more audio streams for users in close proximity to the console and from one or more users associated with network game play. When process 200 is performed by a network device, the audio stream may be received by one or more players by way of one or more network connections. The audio input stream may be detected by at least one sensor during presentation of the electronic game content. Voice data of users may be detected in parallel. For example, multiple users of a game console may each output audio data and sounds. A device, such as control device 105 and/or one or more sensors of control device 105, may detect audio data for one or more users. Users may output audio in one or more overlapping time periods. An audio input stream may be detected for a plurality of users by at least one audio input sensor of the device. The audio input stream may be detected by a microphone array sensor of the device. According to embodiments, detection of voice data includes detection of user position relative to the microphone array.

At block 215, process 200 may include detecting user audio for at least one user in the audio input stream. According to embodiments, one or more users may be identified in an audio stream. Users may be identified to correlate user voice commands with operation of one or more game elements. According to embodiments, detecting at least one user voice in the audio input stream includes using at least one voice reference of a user profile. Voice references for a user can include recorded commands, during gameplay or as part of system configuration, to associate a user voice with one or more game commands. Process 200 may optionally include identifying one or more users present and/or participating in a game session at block 216. Users may be identified based on a login, account or other identifier for a game session. Detecting at least one user voice in the audio input stream can include training a machine model for identification of a user voice. According to embodiments, machine learning models may use one or more voice command models and training data sets characterizing voice and voice commands. Voice command models may include parameters describing game functions, game controls, game characters and game elements for a gaming session. Voice command parameters may be based on a game title, game style of play and game environment. In addition to voice command data, a model may be applied to user actions and data received based on user actions for one or more game titles.

At block 220, process 200 includes detecting at least one command for the electronic game content presentation based on the at least one user voice. According to embodiments, detecting at least one command for the electronic game content includes detecting a control command for at least one game element of the electronic game. Electronic games and a game engine or game control process may be configured to receive one or more control commands from users, the game control commands may be based on one or more of a game element, game element state, game scene, game environment, and game type. According to embodiments, user commands can include one or more spoken commands that may be provided as input in addition to, and/or separate from, input commands of a game controller. According to embodiments, commands may be plain language commands or descriptions of actions from a user for control of a game. Voice commands can include one or more directional commands for moving a game element, one or more function commands (e.g., jump, directional move, fire, punch, etc.). Voice commands may be detected in addition to, or separate from, other user controls. For example, in a fighting game, the voice command may include one or more actions such as punch, kick, block. Detected commands can provide more information or complex information for control of a game element. By way of example, in a fighting game, the voice command may include a combination of actions (e.g., double punch, then kick), and specific actions to take (e.g., uppercut, double high kick, spinning back kick, etc.). According to embodiments, detection of a user command at block 220 can include conversion of a spoken or plain language input to commands available for an electronic game. By way of example, detection of a command may include determining the number or amount of actions from voice. An input command to punch three times or double uppercut may be to control a game element to perform a striking motion for a punch, such as activating the punch for three times or two times with a particular punching style. In a driving or vehicle control game game, a voice command to turn harder may activate or provide an input to increase the amount of steering input. It should be appreciated that the voice commands are not limited to the number or degree of control and may be used in place of, or to supplement, existing game controls. The controller may be configured to modify input controller operations based on one or more settings available to game elements of an electronic game.

According to embodiments, detecting at least one command for the electronic game content at block 220 includes spatial identification of user position including one or more of a location relative to a display device, user posture, and/or user movement. Detecting spatial position may provide assistance in identification of a user for which the command is generated. For example, a user with a position to a side of a display screen (e.g., position 135) may control or select user audio associated with the position for determining user commands. In addition, spatial position of a user may aid in determining a desired command. For example, a user on a first side of a display (e.g., position 135) may indicate a command and the command may be interpreted as a first command when on a first side, and interpreted as a second command when the user is on a second side.

According to embodiments, detecting at least one command for the electronic game content at block 220 includes filtering at least one voice input for detection of the at least one command. Audio input streams may include voice data for one or more users. The audio input stream data may be filtered based on one or more frequency or tonal ranges associated with a user. Voice signatures of a user may be detected and used by a machine learning model for detection of game commands.

At block 225, process 200 includes controlling presentation for the electronic game content based on the at least one command. Control of an electronic game can include controlling one or more game elements and game functions in response to the game command. Electronic game control at block 225 may include control of one or more game menus, and/or control during game play. According to embodiments, process 200 may include logging or generating a transcript of audio input stream state received at block 210 and may optionally output a user chat at block 226. User voice data and/or a chat transcript may be optionally output at block 226 to provide a transcript of game communications and commands. Output at block 226 may be outputting a separated voice transcript for the audio input stream.

Figure 3:
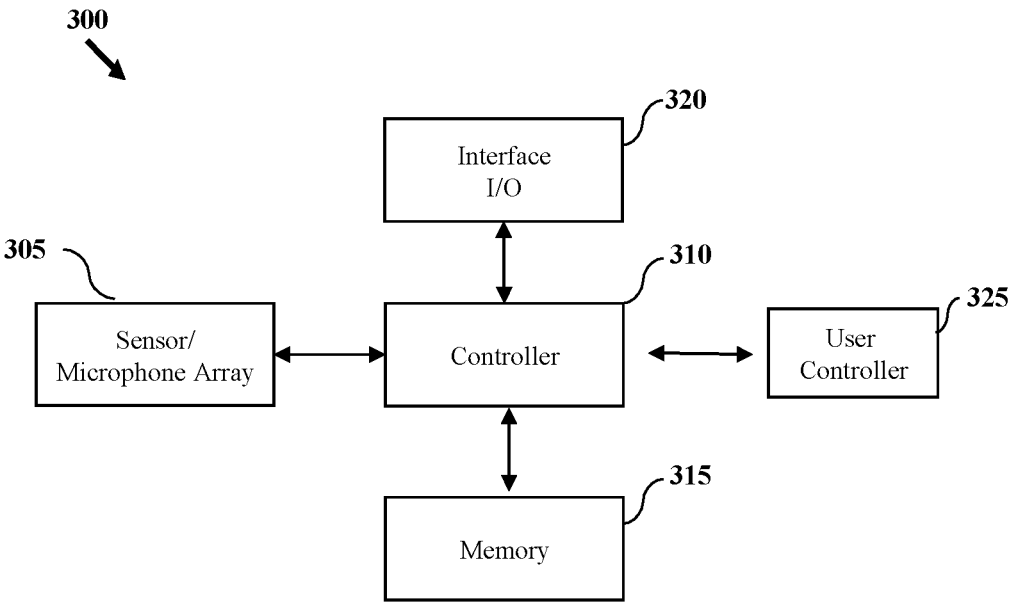
FIG. 3 illustrates a graphical representation of a device configuration according to one or more embodiments.

FIG. 3 illustrates a graphical representation of a device configuration according to one or more embodiments. Device 300 provides a configuration for a device configured for electronic game control with voice detection and audio stream processing. Device 300 and may relate to a gaming console, media device, and/or handheld device. Device 300 may be configured to present and modify gaming content using voice data for at least one user of the electronic game. According to embodiments, device 300 includes a sensor/microphone array device 305, controller 310, and memory 315. Device 300 may also include an interface (e.g., network communication module, input/output (I/O) interface) 320. Device 300 may receive input from a user controller 325, which may be a game controller or a wearable device. Device 300 may output gaming content to a display using interface 320.

Controller 310 may relate to a processor or control device configured to execute one or more operations (e.g., executable instructions) stored in memory 315, such as processes for detecting and using voice commands for control and presentation of gaming content. Memory 315 may be non-transitory memory configured to provide data storage and working memory operations for device 300. Memory 315 may be configured to store computer readable instructions for execution by controller 310 for one or more processes described herein. Interface 320 may be a communications module configured to receive and transmit network communication data.

Device 300 may be configured to receive gaming media (e.g., card, cartridge, disk, etc.) and output visual and audio content of the gaming media to a display. For network games, device 300 may receive game data from a network source. Device 300 may be configured to receive input from one or more peripheral devices, such as sensor 305 and user controller 325.

Controller 310 may be configured to control presentation of gaming content, and receive an audio input stream including voice data for at least one user. Controller 310 may also be configured to update presentation of the gaming content using one or more determined voice commands. Controller 310 may be configured to use and/or train a machine model for identification of a user voice, spatial identification of user position, and filtering of audio input streams to determine a plurality of user commands in parallel. Processes may be used to characterize human voice using models and to detect users in a group. User voice may be a control input in addition to game controller inputs.

Figure 4:
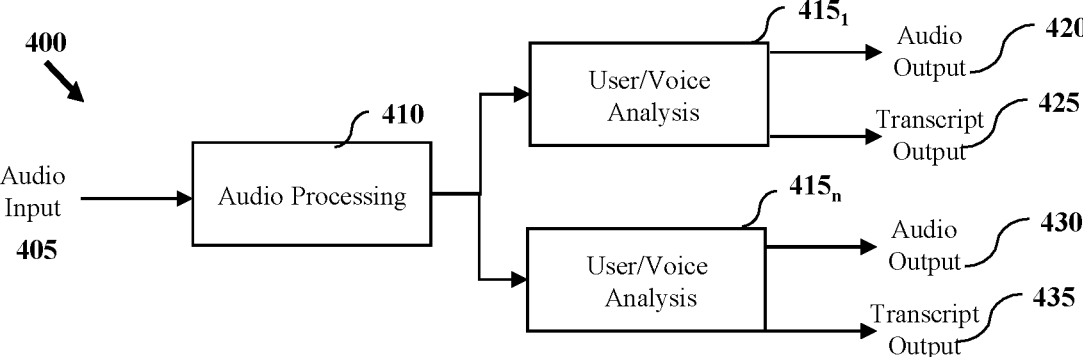
FIG. 4 is a graphical representation of detection of at least one user voice in an audio input stream according to one or more embodiments.

FIG. 4 is a graphical representation of detection of at least one user voice in an audio input stream according to one or more embodiments. Process 400 may be performed by a control device for processing an audio input stream. Process 400 may be initiated by receiving audio input 405 which can include voice data for one or more users of an electronic game. Audio input 405 may include audio for one or more users detected by one or more devices. At block 410 the control device may perform audio processing on audio input 405 to identify one or more users and/or voices. Process 400 may include performing user/voice analysis $415_{1-n}$ for each detected voice. Using models for human speech behavior, human voices in a group of multiple individuals can be detected and isolated into separate digital audio streams for parallel processing by a computer system. This would allow a group of individuals to simultaneously interact with content using voice commands in a multiplayer situation without the game content needing to manage complicated audio processing. Using a microphone array and DSP, phase and timing differences can be detected to spatially identify and differentiate between similar sounding users. Spatial identification can also be done with video and in-game information (e.g., number of players, game genre, etc). Operations of process 400 may be implemented either on a self contained microcontroller, or within system software of a console.

According to embodiments, process 400 may include providing output for detected audio 420 which may be used to detect a voice command. Process 400 may also provide a transcript output 425 which may include one or more of a text and graphical output of detected user voice. Process 400 is illustrated to include voice data for at least one second user including detected audio 430 and a transcript output 435. According to embodiments, one or more of audio output 420 and transcript output 425 may be used to control electronic game presentation for a first user. Similarly, one or more of audio output 430 and transcript output 435 may be used to control electronic game presentation for a first user.

Figure 5:
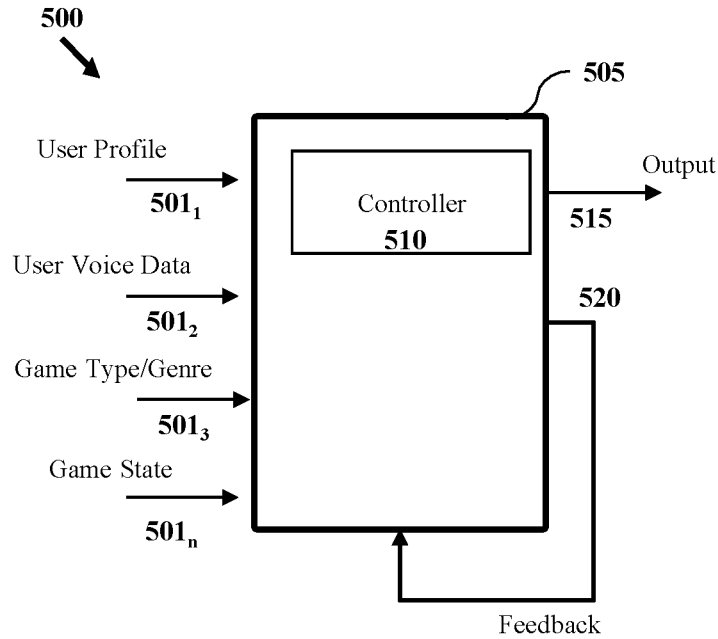
FIG. 5 is a graphical representation of a process for training a model for electronic game control with voice detection and audio stream processing according to one or more embodiments.

FIG. 5 is a graphical representation of a process for training a model for electronic game control with voice detection and audio stream processing according to one or more embodiments. Training process 500 can include receiving training parameters $501_{1-n}$ as training input by a device 505 including a controller 510. According to embodiments, controller 510 may receive a plurality of forms of player input controls and audio data samples as training input. In embodiments, training parameters $501_{1-n}$ may include user profile $501_1$, user voice data $501_2$, game type/genre $503_1$, and game state $501_n$. User profile $501_1$ may provide one or more parameters characterizing a user including gameplay style, user profile entries and one or more language settings. User voice data $501_2$ may provide examples of a user voice to aid in identifying one or more speech patterns and voice recognition. Game type/genre $503_1$ may provide training data regarding commands for a game and mappings of voice to game controls. Game state $501_n$ may relate to one or more parameters or frameworks for permissible game options. Player input controls may be labeled as examples of user actions for gaming content. Based on the training in process 500, controller 510 may generate output 515. Output 515 may include one or more game control parameters for controlling a game session. According to embodiments, controller 510 may be configured to generate output 515 based on a recursive loop including training and feedback. Feedback loop 520 may provide information such as ratings and accuracy for output 515.

According to embodiments, training process 500 and controller 510 may be configured to use one or more learning models (e.g., artificial intelligence, iterative models, etc.) to detect and evaluate audio input streams and voice data. Training process 500 and controller 510 may use one or more libraries of player inputs and voice data as control examples. According to embodiments, output 515 may include output of control signals identifying one or more of voice commands and game control data.

According to embodiments, training process 500 may use a model for human speech and speech patterns. The model may also account for user speech patterns and tones. By detecting a user voice in an audio input stream, user commands may be isolated and separated and multiple user voice commands may be detected in an audio input stream to provide parallel voice processing.

Figure 6:
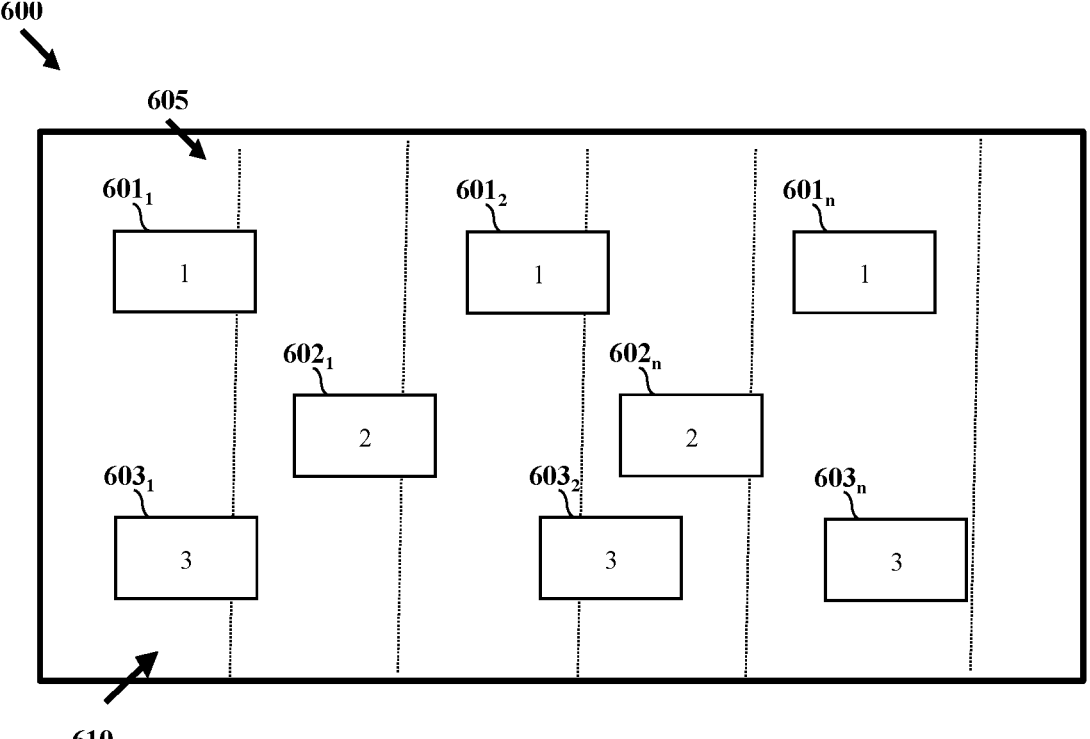
FIG. 6 is a graphical representation of output of an audio stream according to one or more embodiments.

FIG. 6 is a graphical representation of output of an audio stream according to one or more embodiments. Process 600 illustrates an exemplary representation of an audio stream including voice data for a plurality of users. Process 600 may include receiving an audio input stream including voice data $601_{1-n}$ for a first user, voice data $602_{1-n}$ for a second user, and voice data $603_{1-n}$ for a third user. According to embodiments, process 600 may output a graphical representation of a voice transcript for users of an electronic game. FIG. 6 illustrates transcript 605 for voice data $601_{1-n}$ of a first user and transcript 610 for voice data $603_{1-n}$ of another user, such as a third user. According to embodiments, transcript may be output in a graphical configuration for spectators of a multiplayer game. According to embodiments, the graphical configuration may include one or more elements to aid in communication a game state, and game history. The transcript may be generated by a controller to provide a timeline of game events and detected voice commands. Transcript may provide a verified stream of game audio.

While this disclosure has been particularly shown and described with references to exemplary embodiments thereof, it will be understood by those skilled in the art that various changes in form and details may be made therein without departing from the scope of the claimed embodiments.

What is claimed is:

1. A method for electronic game control with voice detection and audio stream processing, the method comprising:

controlling, by a device, presentation of electronic game content on a display;

receiving, by the device, an audio input stream, the audio input stream including voice data for at least one user of the electronic game;

detecting, by the device, at least one user voice in the audio input stream;

detecting, by the device, at least one command for the electronic game content presentation based on the voice data;

controlling, by the device, presentation for the electronic game content based on the at least one command; and outputting a separated voice transcript for the audio input stream.

2. The method of claim 1, wherein the audio input stream is detected by at least one sensor during presentation of the electronic game content, and wherein voice data of a plurality users is detected in parallel.

3. The method of claim 1, wherein the audio input stream is detected for a plurality of users by at least one audio input sensor of the device.

4. The method of claim 1, wherein the audio input stream is detected by a microphone array sensor of the device, and wherein detection of voice data includes detection of user position relative to the microphone array.

5. The method of claim 1, wherein detecting at least one user voice in the audio input stream includes using at least one voice reference of a user profile.

6. The method of claim 1, wherein detecting at least one user voice in the audio input stream includes using a machine model for identification of a user voice.

7. The method of claim 1, wherein detecting at least one command for the electronic game content includes spatial identification of user position.

8. The method of claim 1, wherein detecting at least one command for the electronic game content includes detecting a control command for at least one game element of the electronic game.

9. The method of claim 1, wherein detecting at least one command for the electronic game content includes filtering at least one voice input for detection of the at least one command.

10. A device configured for electronic game control with voice detection and audio stream processing, the device comprising:

an interface configured to output gaming content;

a memory storing executable instructions; and a controller coupled to the interface and the memory, wherein the controller is configured to perform operations comprising:

controlling presentation of electronic game content on a display;

receiving an audio input stream, the audio input stream including voice data for at least one user of the electronic game;

detecting at least one user voice in the audio input stream;

detecting at least one command for the electronic game content presentation based on the voice data;

controlling presentation for the electronic game content based on the at least one command; and outputting a separated voice transcript for the audio input stream.

11. The device of claim 10, wherein the audio input stream is detected by at least one sensor during presentation of the electronic game content, and wherein voice data of a plurality of users is detected in parallel.

12. The device of claim 10, wherein the audio input stream is detected for a plurality of users by at least one audio input sensor of the device.

13. The device of claim 10, wherein the audio input stream is detected by a microphone array sensor of the device, and wherein detection of voice data includes detection of user position relative to the microphone array.

14. The device of claim 10, wherein detecting at least one user voice in the audio input stream includes using at least one voice reference of a user profile.

15. The device of claim 10, wherein detecting at least one user voice in the audio input stream includes using a machine model for identification of a user voice.

16. The device of claim 10, wherein detecting at least one command for the electronic game content includes spatial identification of user position.

17. The device of claim 10, wherein detecting at least one command for the electronic game content includes detecting a control command for at least one game element of the electronic game.

18. The device of claim 10, wherein detecting at least one command for the electronic game content includes filtering at least one voice input for detection of the at least one command.

* * * * *